(12) United States Patent
Grau

(10) Patent No.: US 8,927,920 B2
(45) Date of Patent: Jan. 6, 2015

(54) CORRECTING GAMMA-RAY ENERGY SPECTRA FOR PILEUP DEGRADATION

(71) Applicant: Schlumberger Technology Corporation, Sugar Land, TX (US)

(72) Inventor: James A. Grau, Marshfield, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 74 days.

(21) Appl. No.: 13/761,982

(22) Filed: Feb. 7, 2013

(65) Prior Publication Data

US 2014/0217273 A1 Aug. 7, 2014

(51) Int. Cl.
*G01V 5/04* (2006.01)
*G01T 1/36* (2006.01)

(52) U.S. Cl.
CPC .... *G01V 5/04* (2013.01); *G01T 1/36* (2013.01)
USPC .................................................. 250/252.1

(58) Field of Classification Search
CPC ............. G01T 1/171; G01T 1/17; G01V 5/04
USPC ..................................................... 250/252.1
See application file for complete search history.

(56) References Cited

U.S. PATENT DOCUMENTS

| | | | | |
|---|---|---|---|---|
| 6,160,259 | A * | 12/2000 | Petrillo et al. | 250/363.07 |
| 7,152,002 | B2 * | 12/2006 | Lingren et al. | 702/23 |
| 7,778,783 | B2 * | 8/2010 | Lingren et al. | 702/28 |
| 2002/0121603 | A1 * | 9/2002 | Wong et al. | 250/363.09 |
| 2003/0076914 | A1 | 4/2003 | Tiller et al. | |
| 2007/0290126 | A1 | 12/2007 | Kurkoski et al. | |
| 2010/0027747 | A1 | 2/2010 | Mott | |
| 2010/0243877 | A1 | 9/2010 | Berheide et al. | |
| 2010/0270472 | A1 * | 10/2010 | Proksa et al. | 250/371 |
| 2012/0041700 | A1 | 2/2012 | Scoular et al. | |

OTHER PUBLICATIONS

International Search Report and the Written Opinion for International Application No. PCT/US2014/014450 dated Jun. 25, 2014.

* cited by examiner

*Primary Examiner* — Marcus Taningco
(74) *Attorney, Agent, or Firm* — Cathy Hewitt

(57) ABSTRACT

A method for correcting detected gamma ray spectra for the effects of energy analyzer pileup includes assigning detected gamma rays to channels in a multichannel analyzer (MCA). A pileup spectrum is estimated. The pileup spectrum is subtracted from the measured spectrum. The result thereof is compared to the preceding estimated pileup free spectrum and the estimating the pileup spectrum, subtracting the pileup spectrum and comparing is repeated until the difference between successive estimates of the pileup-free spectrum falls below a selected threshold.

26 Claims, 8 Drawing Sheets

CORRECTING GAMMA-RAY ENERGY SPECTRA FOR PILEUP DEGRADATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates generally to the field of scintillation type radiation detectors. More specifically, the invention relates to methods for adjusting spectral analysis of radiation detected with scintillation counters for the effects of "pile up" on the analyzed radiation spectra.

Certain types of well logging instruments have gamma ray radiation detectors capable of making measurements related to the numbers of and the energy of detected gamma rays. The gamma rays may be naturally occurring or may result from interaction of radiation emitted into formations surrounding a wellbore by a chemical radioisotope or an electrically controlled source, such as an x-ray generator of neutron generator of types well known in the art.

The energy of the detected gamma rays may be determined using a scintillation detector coupled to a photomultiplier. A pulse height analyzer or multichannel analyzer (MCA) coupled to the output of the photomultiplier. Present versions of the MCA include "integrator" type MCAs, wherein each analyzer channel integrates the amplitude of all pulses occurring within a selected voltage range and within a selected time window. When detected events are too closely spaced in time to be separately identifiable, the result is known as "pileup." The response of modern integrator-type MCA to multiple detection events is much simpler than what was encountered with earlier ramp analog to digital convertors (ADC's), which just determined the maximum of each voltage pulse from the photomultiplier to assign each pulse to a selected energy level channel. An integrator-type MCA will produce a summed response nearly identical to the sum of the responses that it would have produced for each individual pulse had they been adequately separated in time; whereas, the response of a ramp ADC would depend on the exact time separation of the multiple events.

Measurement of gamma-ray energy spectra, regardless of how those gamma rays are produced, but especially to measurements made at high count rates, where multiple events detected closely in time may be included in the measured spectrum as single detection events with an apparent energy equal to or approaching the sum of the energies of the closely-spaced events benefit from removal of pile up distortion in the acquired spectra. Because of the random nature of the time coincidence of multiple detection events in pileup, pileup events contain virtually no useful information. Such events merely add erroneous detection events to the overall gamma ray detection spectrum leading to the desire to remove them from the spectrum. There is a need for methods to remove pileup events that had not been recognized as being too closely spaced in time and thus not rejected by the data acquisition system.

SUMMARY

A method according to one aspect for correcting detected gamma ray spectra for the effects of energy analyzer pileup includes assigning detected gamma rays to channels in a multichannel analyzer (MCA). A pileup spectrum is estimated. The pileup spectrum is subtracted from the measured spectrum. The result thereof is compared to the preceding estimated pileup free spectrum and the estimating the pileup spectrum, subtracting the pileup spectrum and comparing is repeated until the difference between successive estimates of the pileup-free spectrum falls below a selected threshold.

Other aspects and advantages will be apparent from the description and claims that follow.

DETAILED DESCRIPTION

Figure 1A:
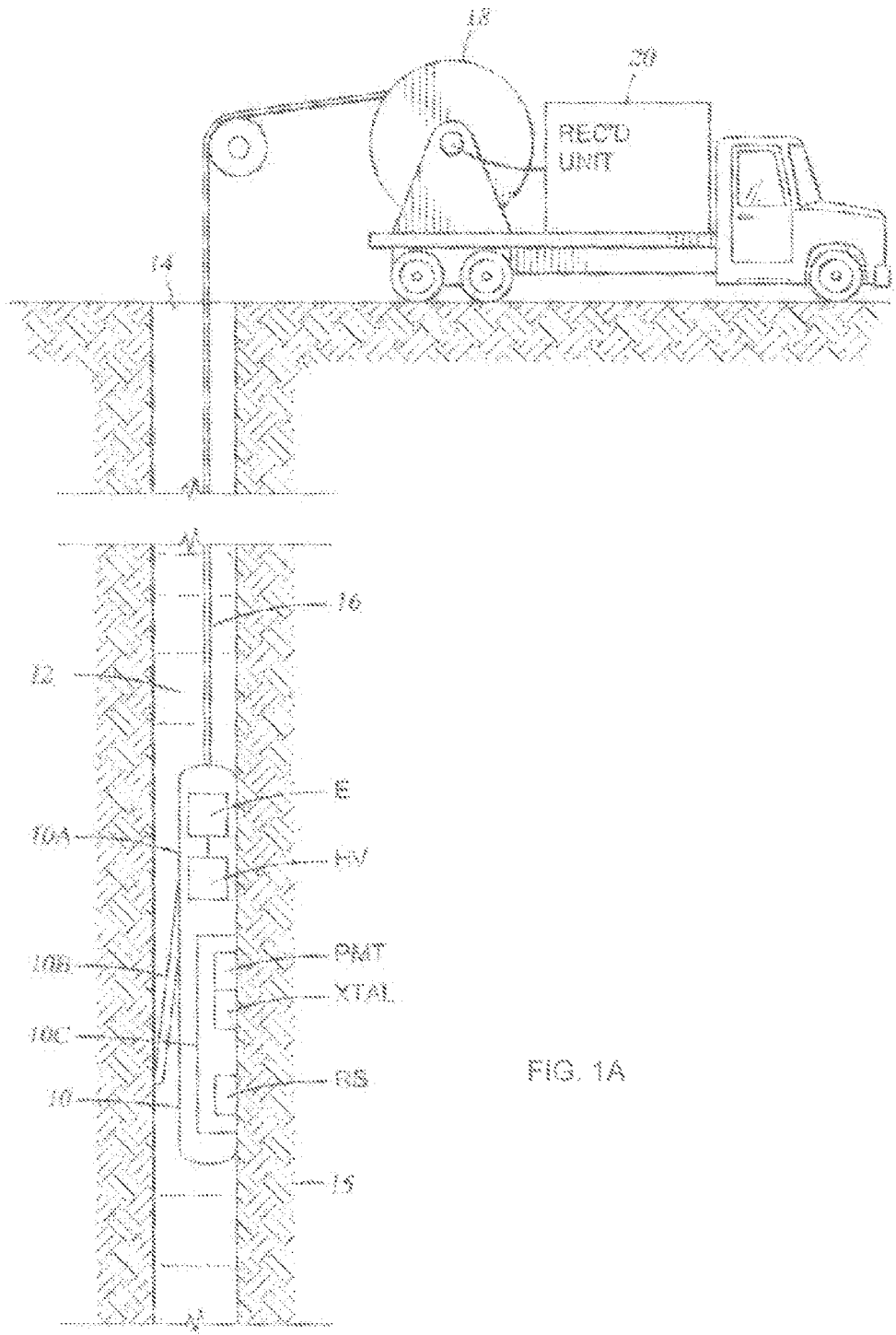
FIG. 1A shows an example well logging instrument being moved through a wellbore.
Figure 1B:
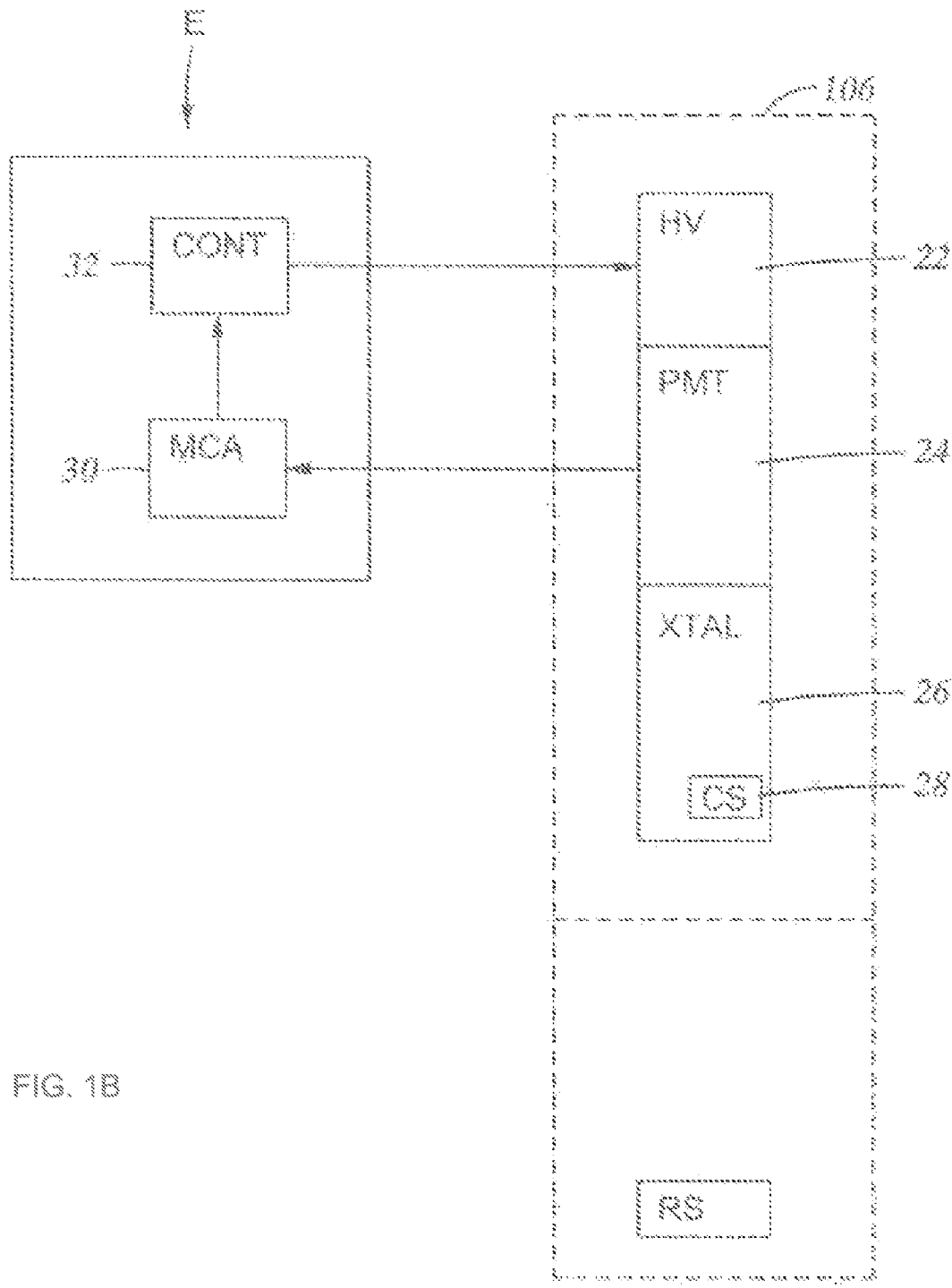
FIG. 1B schematically shows some of the functional components of the well logging instrument in FIG. 1A.

A well logging instrument including a scintillation detector type radiation counter is shown at 10 in FIG. 1 as it is ordinarily used in a procedure to make measurements of properties of subsurface Earth formations penetrated by a wellbore. The wellbore 12 is drilled through the formations, shown generally at 15. The wellbore 12 may be filled with liquid called "drilling mud" 14 during the drilling and well logging procedure. The well logging procedure includes lowering the well logging instrument 10 into the wellbore 12. The instrument 10 may be attached to one end of an armored electrical cable 16. The cable 16 is extended into the wellbore 12 by a winch 18 or similar spooling device to lower the instrument 10 into the wellbore 12. The winch 18 may then be operated to withdraw the cable 16 from the wellbore while various sensors (to be further explained) in the instrument 10 make measurements of various properties of the formations 15 penetrated by the wellbore 12. Electrical power may be transmitted along the cable 16 from the surface to operate the instrument 10. Signals corresponding to the measurements made by the various sensors in the instrument 10 may be transmitted along the cable 16 for recording and/or interpretation in a recording unit 20 at the Earth's surface. It should be noted that the invention described here is not limited to well logging, it could be applied in any other application where pulse pile up distortion of gamma ray spectra needs to be corrected to obtain an accurate spectral analysis.

The present example of the well logging instrument may be an instrument that makes measurements corresponding to any property of the Earth formations 15 based on spectral analysis of detected gamma rays. Such instruments include a housing 10A in which is disposed certain electronic circuitry, shown generally at E and to be further explained below. The housing 10A may or may not include a backup pad or arm 10B that is biased to one side of the instrument 10 to urge the other side of the instrument 10 into contact with the wall of the wellbore 12. The other side of the instrument 10 may or may not include a tungsten or similar high density skid or pad 10C in which is disposed a source of gamma radiation RS. The radiation source RS may be a chemical isotopic source such as cesium-137 disposed in a pressure proof housing. The radiation source RS may also be an electrically operated device such as an X-ray tube, or a pulsed or other neutron generator that emits controlled duration "bursts" of high energy neutrons. The radiation source RS may also be a chemical isotope source such as americium-beryllium. The type of radiation source, and its inclusion in various examples is not intended to limit the scope of the present disclosure.

One or more radiation detectors including a scintillation detector, which may be a crystal XTAL optically coupled to a photon detector such as a photomultiplier PMT may be disposed in the pad 10C. A controllable high voltage power supply HV is coupled to the photomultiplier PMT to enable photons applied thereto to be converted to voltage pulses as will be familiar to those skilled in the art. The voltage output of the high voltage power supply HV can be controlled by a controller (not shown separately in FIG. 1) forming part of the circuitry E to cause the high voltage supply HV maintain a suitable voltage on the photomultiplier PMT.

It is to be clearly understood that the example well logging instrument shown in FIG. 1 is only for purposes of illustrating the source of photomultiplier-generated voltage pulses to be processed according to the invention, and an apparatus according to the invention that maintains suitable voltage on the photomultiplier. Other radiation detecting well logging instruments may include more than one scintillation type radiation detector, or radiation detectors responsive to different energy levels of radiation for analyzing different properties of the formations, and such instruments are within the scope of this invention. It is also to be understood that the scintillation detector may be coupled to a photon detector other than a photomultiplier in other examples. In still other examples, radiation detectors such as solid state detector and gas detectors may be used. Accordingly, the scope of the present disclosure is not limited to the example detector shown herein. It is also to be clearly understood that the manner of conveyance of the well logging instrument 10 shown in FIG. 1 is merely illustrative of one manner of conveyance. Any manner of conveyance of a well logging instrument that makes radiation measurements as explained herein is also within the scope of this invention. Such conveyance methods include, but are not limited to, coupling the instrument to the end of a drill pipe, coiled tubing, production tubing or other pipe device, or housing the instrument in a drill collar adapted to be coupled within a drill string such that the instrument makes measurements during the drilling of the wellbore 12 through the formations 15, such conveyance known in the art as "logging while drilling" (LWD). It is also to be clearly understood that the wellbore configuration shown in FIG. 1, in which the wellbore is exposed directly to the formations (referred to as "open hole") is not a limit on the use of radiation detectors according to the various aspects of the invention. The invention is equally applicable in wellbores having a pipe or conduit inserted and/or cemented therein (referred to as "cased hole").

Figure 2:
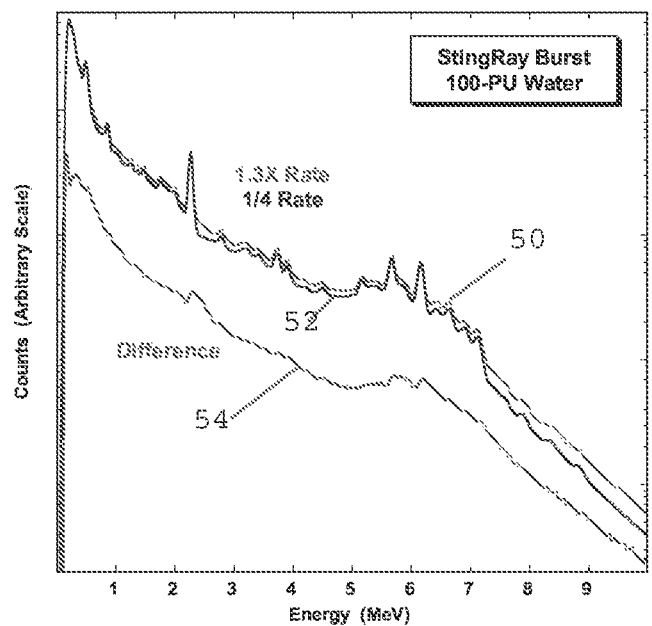
FIG. 2 shows a graph of the shape of pileup degradation in the burst spectrum of a 100 p.u. water tank, determined from the difference between high and low count rate spectra.

A more detailed view of the active components of the well logging instrument is shown in FIG. 2 The scintillation detector 26 is disposed in the pad 10C such that it is exposed to radiation emanating from the surrounding Earth formations (15 in FIG. 1). The crystal 26 may be, for example, a material such as thallium-doped sodium iodide, bismuth germanate, gadolinium oxyorthosilicate, lutetium oxyorthosilicate, lanthanum bromide, lithium-6 doped silica glass, or any other material used to detect radiation that generates flashes of light when a suitable radiation particle or photon enters the crystal. The scintillation detector 26 may in some examples include therein a calibration source 28 that includes a small active amount of a source of radiation of known energy spectrum. For example, in a density measuring device, the calibration source 28 may be cesium-137, because such source material emits substantially monochromatic gamma photons of energy 662 keV, as explained in the Background section herein. The scintillation detector 26 is optically coupled to a photomultiplier (PMT) 24, although other detector types may be used as previously explained. The photomultiplier 24 is energized by a controllable high voltage supply 22. Typical voltages applied to the photomultiplier 24 will be in a range of approximately 800 to 2200 volts, depending on the type of photomultiplier used. Some PMTs operate at lower voltages. The high voltage supply 22 may have voltage output adjustable to a precision of about 0.1 volts although such resolution and the actual voltage range are not intended to limit the scope of this disclosure. The voltage applied by the high voltage source 22 may be controlled by a controller 32. The controller 32 may be a microprocessor based controller that can execute an embedded computer program. Also, it should be noted that the description shown here is for a density measurement instrument using a pad tool, while other spectral gamma ray tools may use a cylindrical pressure housing without a pad, etc.

As explained in the Background section herein, radiation to which the scintillation detector 26 is sensitive will, when entering the detector 26, cause the scintillation detector 26 to emit a flash of light having amplitude corresponding to the energy of the entering radiation event. The flash of light causes the photomultiplier 24 to produce a voltage pulse that corresponds in amplitude to the amplitude of the light flash generated by the detector 26. The voltage pulse output of the photomultiplier 24 may be coupled to a multichannel pulse amplitude analyzer ("MCA") 30. The MCA 30 may be an integrating type and may include a threshold discriminator to reject any pulse events having peak amplitude below a selected threshold (to avoid, for example, counting so called "dark counts" that may be output from the photomultiplier. The MCA may also be a ramp ADC type. The particular configuration of the MCA is not a limitation on the scope of the present disclosure. Each detected voltage pulse will cause incrementing of a counter corresponding to the detected voltage pulse's amplitude. Numbers of detected pulses having particular detected amplitudes are used to spectrally analyze the energy content of the radiation detected by the scintillation detector 26. To accurately characterize the energy of the detected radiation events, it is necessary to characterize the output of the MCA 30 with respect to energy of the detected radiation. The present disclosure has as a purpose adjusting the count rate spectrum for pileup so that the characterization of the MCA output more accurately represents to the energy spectrum of the detected radiation in the absence of pileup.

The response of integrator-type MCAs to multiple detection events is much simpler than what was encountered with older, ramp analog to digital convertors (ADC's), which just measured the maximum of the voltage pulse to assign the channel to the detected radiation event. In the presence of undetected pileup, an integrator-type MCA will produce a summed response nearly identical to the sum of the responses that it would have produced for each individual event had they been adequately separated in time. By contrast, the response of a ramp ADC would depend on the exact time separation of multiple detection events. What this means is that the shape of the spectrum of pileup events can be accurately predicted for integrator-type MCAs equipped with pile up rejection logic by a self-convolution of the ideal energy spectrum that is conducted to the MCA. In particular a pileup spectrum involving 2 events, for example, would be the simple convolution of the ideal spectrum with itself. The pileup spectrum involving 3 events would be the convolution of the ideal spectrum with the 2-event pileup spectrum. The foregoing convolution process could in theory be continued for any number of unresolved pileup events. As a practical matter if it is needed to correct for more than 3 coincident events the detector count rate is likely too high for acceptable spectral analysis and should be avoided if at all possible. Indeed for most applications, including the ones shown in examples herein, there is no need to correct for more than 2 coincident events.

Figure 3:
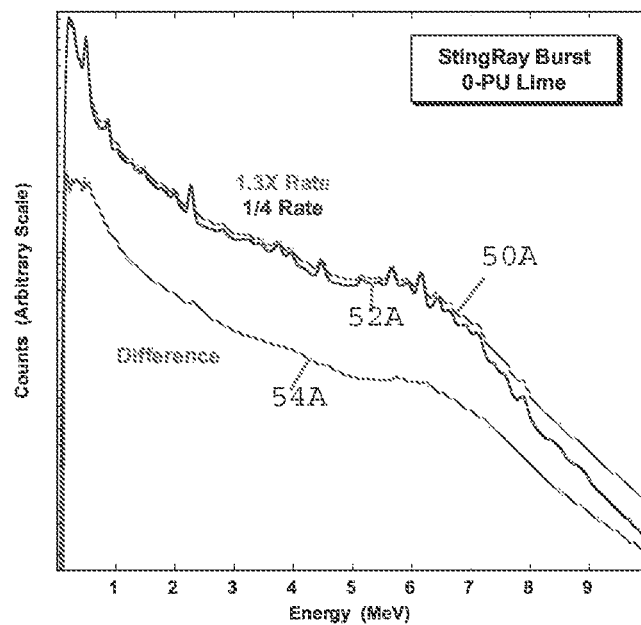
FIG. 3 shows the shape of pileup degradation in the burst spectrum of 0 p.u. limestone, determined from the difference between the high and low count rate spectra.
Figure 4:
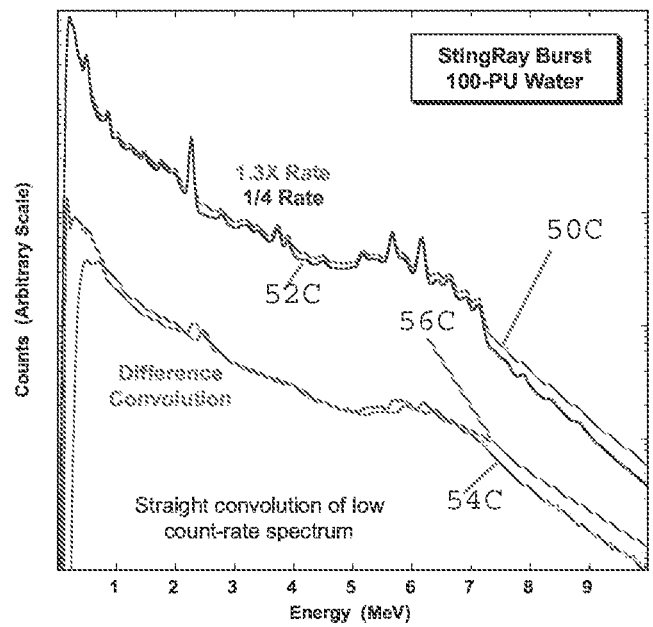
FIG. 4 shows a comparison of the measured pileup degradation to a simple convolution of the low count rate spectrum with itself.
Figure 5:
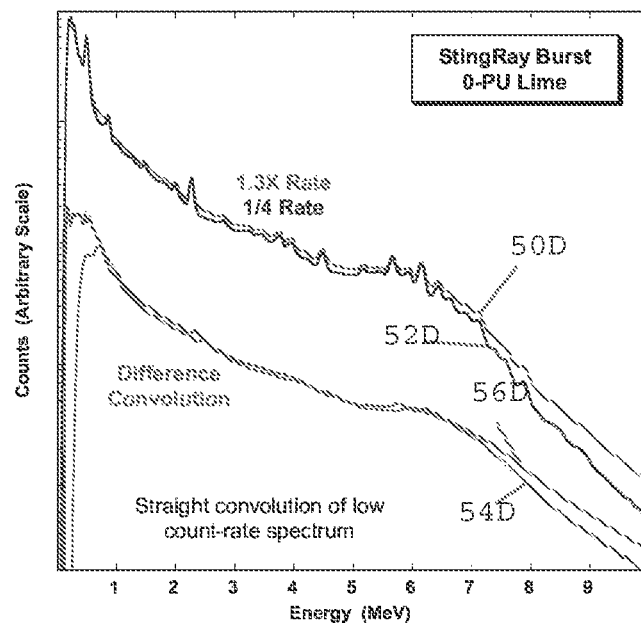
FIG. 5 shows a comparison of the measured pileup degradation to a simple convolution of the low count rate spectrum with itself.

In order to explain the principle of methods according to the present disclosure, it should be noted that it is possible to measure the shape of the pileup-caused degradation in the measured gamma ray spectrum for a particular measurement environment using variable count rate measurements in the same measurement environment. For example, FIGS. 2 and 3 show, respectively, neutron-induced gamma-ray spectra (using a pulsed neutron generator) measured during the neutron burst for two different environments (100 porosity unit ["p.u.", e.g., water in a tank] and 0 p.u. limestone rock formation at two different neutron output rates differing by about a factor of 5. Subtracting the low-count-rate spectrum multiplied by an empirically determined factor, shown at curve 52 in FIGS. 2 and 52A in FIG. 3 from the high-count-rate spectrum, shown at curve 50 in FIGS. 2 and 52A in FIG. 3, with the criterion of eliminating cleanly resolved peaks should result in the spectrum of events due to pileup, which is shown as the "Difference" spectrum at curve 54 in FIGS. 2 and 54A in FIG. 3. One can perform a first test to see whether the difference spectrum can be reproduced via convolution by approximating a pileup-free spectrum by the low-count-rate spectrum. This comparison is shown in FIGS. 4 and 5, which indicate a rather poor reproduction of the pileup shape by this simple convolution, wherein the convolution is represented by curves 56C and 56D, respectively. A small part of the discrepancy between the convolution (56C, 56D) and the difference (54C, 54D) is because the low count rate spectrum is not completely pileup free. A principal reason for the discrepancy however is the low-level discriminator, which is used in most MCA systems and is intended, as previously explained, to reduce MCA dead time by freeing the MCA from having to process mostly meaningless low-energy events, including noise events, that have little to no information content.

Figure 6:
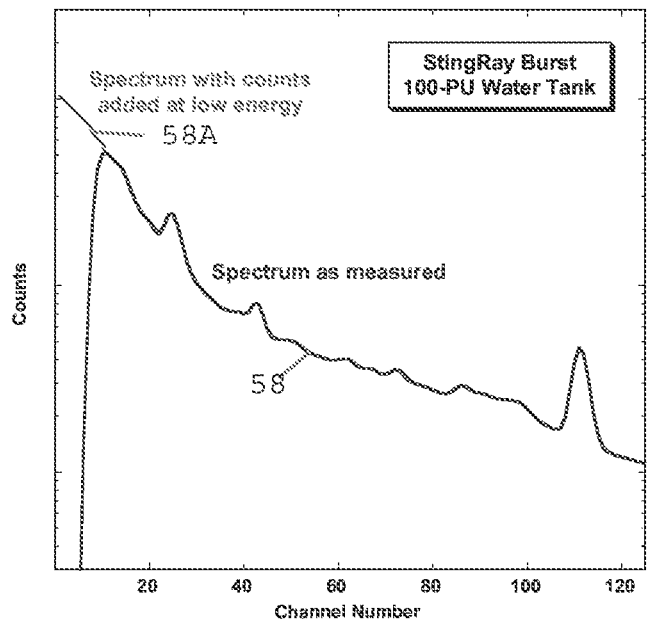
FIG. 6 shows artificially added counts at low energy that were necessary to accurately predict the pileup spectrum.
Figure 7:
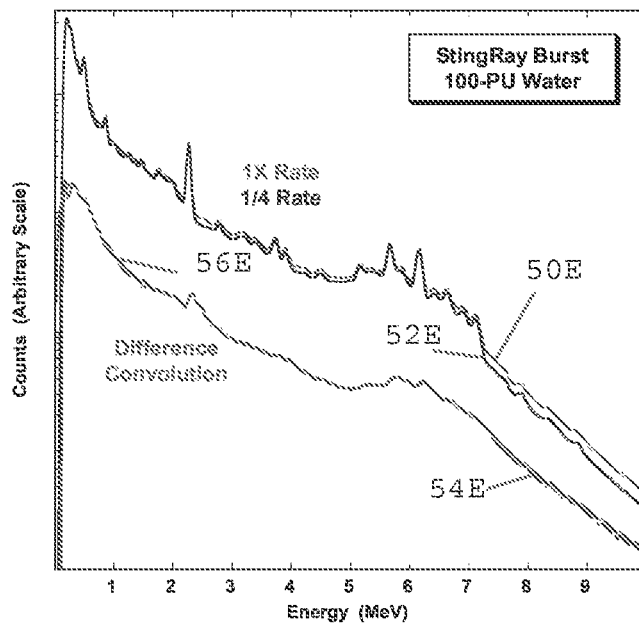
FIG. 7 shows a comparison of the measured pileup degradation to a convolution of the low count rate spectrum with itself after artificially adding counts at low energy.

One possible technique to account for such low-energy events that are missing from the measured spectrum is shown in FIG. 6, which is to simply add a straight line number of counts in the lower energy channels, e.g., having twice as many events at channel 1 as at channel 11. The foregoing is shown in FIG. 6 as line 58A at the lower end of the measured spectrum curve 58. The foregoing addition may provide a modified measured spectrum. Convolving the modified spectrum appears to produce a near perfect agreement with the measured pileup spectrum shape, as can be observed in FIG. 7 at 56E and 54E for the 100 p.u. (water tank) measurement. A slight overestimation at high energy may occur because the low-count-rate spectrum in practice has a non-zero amount of pileup degradation, which preferentially adds counts at higher energies. There are other ways to obtain a low energy spectrum. For example, one could measure spectra at low energy using a higher gain to obtain an accurate representation. This could be performed in the same tool by adding a high gain channel to obtain the low energy part of the spectrum, by performing a calibration or characterization for representative spectra and using the known spectrum shape for extrapolation or by performing an occasional or periodic high gain measurement during logging (at a loss of relevant spectral information during such an interval).

The intent of the foregoing explanation is to show that a simple convolution of a pileup-free spectrum with a measured spectrum will accurately reproduce the shape of the pileup spectrum, provided that unmeasured events at low energy are accounted for.

In order to remove pileup from an arbitrary measured spectrum two pieces of information are needed: (1) the shape of the pileup spectrum, and (2) the fractional contribution of the foregoing shape in the measured spectrum.

An example method of estimating the number of pileup events that are present in the measured spectrum may be used in example methods according to the disclosure. One may assume that the number of 2-event non-rejected pileup events is a linear multiple of the true instantaneous count rate incident to the MCA. Using variable count rate measurements such as the ones described in FIGS. 2 and 3, coupled with an effective neutron output monitor, one can determine both the pileup count rate loss corrections needed to compute the true detector count rates and the fraction of pileup events in each spectrum. A technique that may be used is basically a consistency measure that results in the best match of high and low count rate spectra after correcting both for pileup using the difference spectrum and an assumed linear relation between fraction of pileup and true instantaneous count rates. In the absence of a neutron source monitor (where the radiation source is a neutron source) one can substitute oxygen activation count rate in the burst-off background spectrum, which is usually a low count rate with virtually no pileup count rate losses.

An example technique for determining a pileup corrected detected gamma ray energy spectrum may be implemented as follows. This method considers that pileup only consists of the sum of two pulses, which are not resolved in time.

1. Start with the measured spectrum (MeasSpec) which in general may be somewhat nonlinear, i.e., the MCA channel number with respect to gamma ray energy level will not be linear.

2. Optionally linearize the measured spectrum to create MeasSpecLin. One may use, for example, a spectral transform which changes the channel-vs-energy calibration of the spectrum so that the MCA channels substantially represent a linear relationship between channel number and detected gamma ray energy level. In particular one may express each channel of the measured spectrum as a second-degree polynomial with respect to the gamma-ray energy: Channel Number=Offset+Gain*Energy+NonLinearity*Energy$^2$. A transform such as the foregoing may be used to match the energy calibration of the measurements made by the instrument in the wellbore (FIG. 1) to that of elemental standard spectra. The parameters Offset, Gain, and NonLinearity may be optimized by the Marquardt solver in the spectral analysis. For the present method the convolved spectrum should be linear, otherwise the assumption that the integrated response to pileup events is equal to the sum of the individual responses would not be correct.

3. Add events in the low energy MCA channels to MeasSpecLin to reflect events removed from the detected spectrum as a result of the discriminator.

For the examples shown herein the low energy channels may be populated as explained with reference to FIG. 6, e.g., a straight line from channel 1 to channel 11 with twice as many counts in channel 1 as in channel 11. The exact proportion of the low energy channel events may simply be optimized to give the best match for the final corrected test spectra that were measured at different count rates.

4. Compute the fraction (FracPU) of pileup in the measured spectrum MeasSpec as a function of the count rate.

One may compute the fraction as a polynomial function of the duty-factor-corrected detector count rate. The coefficients of the polynomial may be determined from the best match to the pileup fractions determined from the variable count rate measurements.

5. Set MeasSpecLin as a first estimate of the pileup-free spectrum PUFreeSpecLin.

6. Estimate the pileup spectrum (PUSpec(i)) channel by channel by convolving PUFreeSpecLin to obtain $$PUSpec(i) = \sum_{m=0}^{i} (PUfreeSpecLin(m) \cdot PUfreeSpecLin(i - m)),$$

where represents simple multiplication. m and i are channel numbers, i being the channel of the output of the convolution and m the channel over which the sum is performed (i.e., the integration variable if this were an integral rather than a sum). There are other convolution algorithms that provide the same result.

7. Compute a normalized subtraction factor as SubNorm=FracPU*ΣMeasSpecLin/ΣPUSpec where the sums Σ are over the same channels that were used for the pileup fraction computed in step 4.

The normalized subtraction factor is as determined described in the next step in the present example method.

8. Estimate the pileup-free spectrum as PUFreeSpecLin=MeasSpecLin−SubNorm*PUSpec.

9. Check for convergence of PUFreeSpecLin and return to step 6 if more iterations are needed. Convergence may be determined for example by saving the estimation of PUFreeSpecLin from the previous iteration and comparing it to the value from the current iteration. Convergence may be determined when a difference between the previous iteration and the current iteration falls below a selected threshold.

Figure 8:
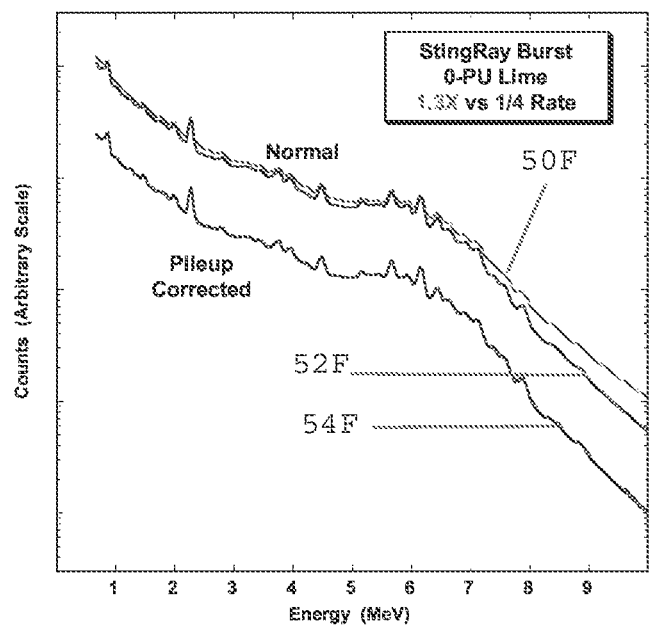
FIG. 8 shows a comparison of high and low count rate spectra with and without pileup corrections for neutron burst induced spectra in a 0 p.u. limestone.
Figure 9:
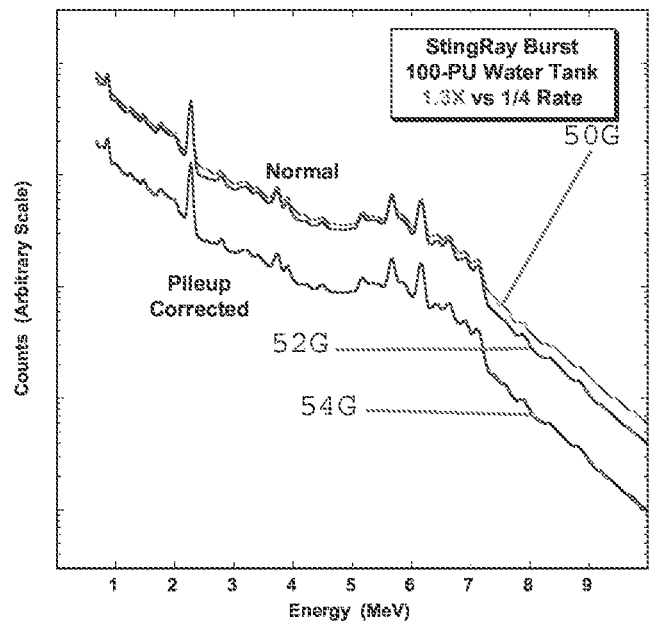
FIG. 9 shows a comparison of high and low count rate spectra with and without pileup corrections for neutron burst induced spectra from 100 p.u. water tank.

FIG. 8 shows a comparison of high and low count rate spectra without pile up corrections at 50F, 52F and with pile up correction at 54F (two virtually identical curves for high and low count rate), respectively. Note that the pile up corrected spectra are offset vertically for clarity. The spectra were obtained using a pulsed neutron source operated in zero porosity (0 p.u.) limestone rock formation. FIG. 9 shows a similar comparison but for gamma rays detected in a water tank (100 p.u.), at 50G, 52G and 54G respectively. In each of the examples shown in FIGS. 8 and 9, the gamma rays were detected during the neutron burst using a pulsed neutron source.

Figure 10:
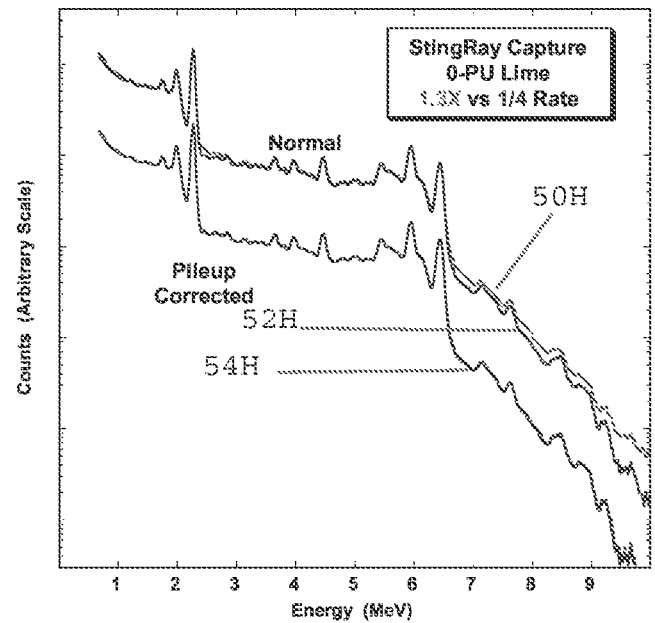
FIG. 10 shows a comparison of high and low count rate spectra with and without pileup corrections for capture gamma ray spectra from 0 p.u. limestone.
Figure 11:
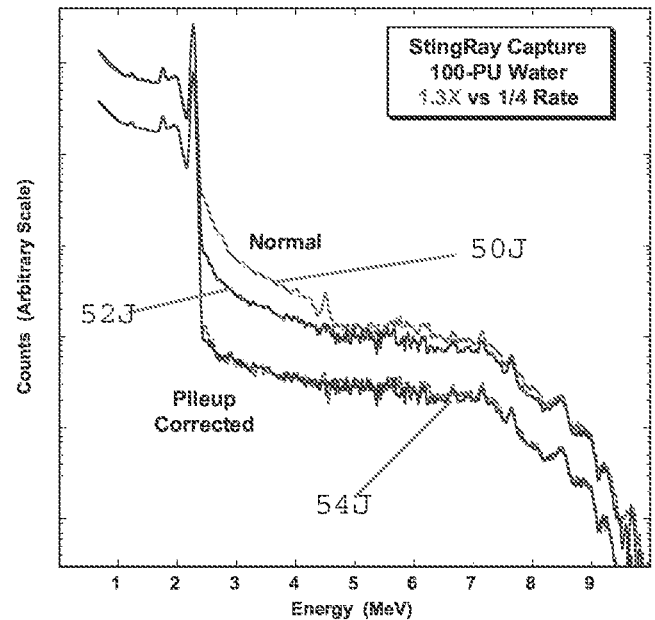
FIG. 11 shows a comparison of high and low count rate spectra with and without pileup corrections for capture gamma ray spectra from 100 p.u. water tank.

FIGS. 10 and 11 show similar high and low count rate spectra and pileup corrected spectra for capture gamma rays in 0 p.u. limestone and a water tank, respectively, at 50H, 52H, 54H in FIG. 10 and at 50J, 52J, 54J in FIG. 11. Different approaches can be used for the convolution of 2 spectra or for the case of more than 2 non-time resolved pulses contributing to the spectral pileup.

Figure 12:
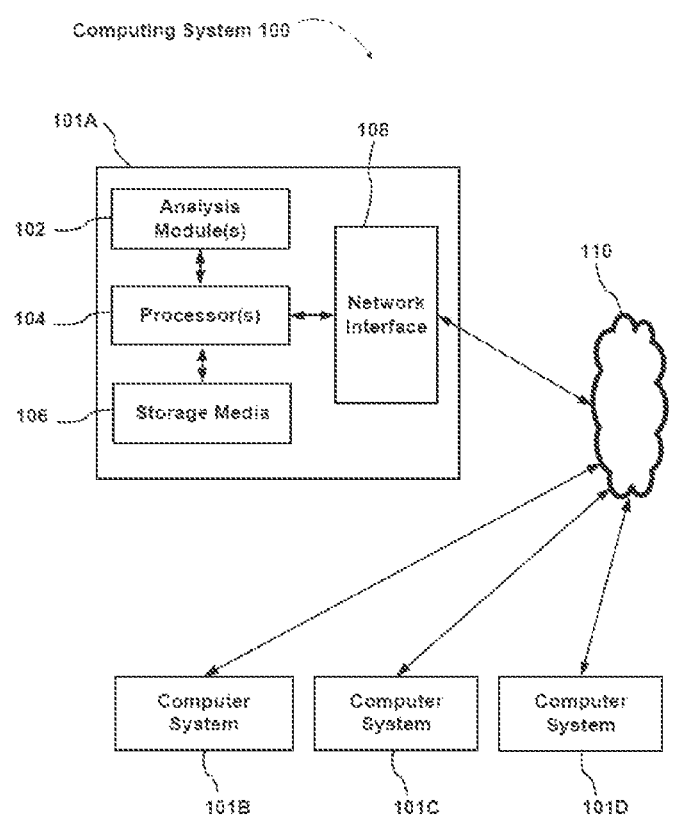
FIG. 12 shows an example computer system for performing a method according to the disclosure.

FIG. 12 depicts an example computing system 100 in accordance with some embodiments. The computing system 100 may be an individual computer system 101A or an arrangement of distributed computer systems, and one or more of the computer system components may be disposed in the recording system (FIG. 1). The computer system 101A may include one or more analysis modules 102 that may be configured to perform various tasks according to some embodiments, such as the tasks depicted in FIG. 12. To perform these various tasks, analysis module 102 may execute independently, or in coordination with, one or more processors 104, which may be connected to one or more storage media 106. The processor(s) 104 may also be connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be on a ship underway on the ocean or on a well drilling location, while in communication with one or more computer systems such as 101C and/or 101D that may be located in one or more data centers on shore, aboard ships, and/or located in varying countries on different continents). Note that the any part of the computer or processor can be located in the well logging tool itself. This is of particular interest in logging while drilling (LWD), where it is impractical to send spectral information to the surface in real time.

A processor can include a microprocessor, microcontroller, processor module or subsystem, programmable integrated circuit, programmable gate array, or another control or computing device.

The storage media 106 can be implemented as one or more computer-readable or machine-readable storage media. Note that while in the exemplary embodiment of FIG. the storage media 106 are depicted as within computer system 101A, in some embodiments, the storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above may be provided on one computer-readable or machine-readable storage medium, or alternatively, can be provided on multiple computer-readable or machine-readable storage media distributed in a large system having possibly plural nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the example embodiment of FIG. 12, and/or computing system 100 may have a different configuration or arrangement of the components depicted in FIG. 12. The various components shown in FIG. 12 may be implemented in hardware, software, or a combination of both hardware and software, including one or more signal processing and/or application specific integrated circuits.

Further, the steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

Methods according to the present disclosure may provide more accurate correction of measured gamma ray energy spectra for the effects of pileup using integrator type multichannel analyzers.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for correcting detected gamma ray spectra for the effects of energy analyzer pileup, comprising:
assigning gamma rays detected by a radiation detector having output signals related to an energy level of detected gamma rays to channels in a multichannel analyzer (MCA) wherein each channel represents a selected gamma ray energy level to generate a measured spectrum;
in a computer, computing a pileup fraction of the measured spectrum;
in the computer, estimating a pileup spectrum from an estimate of a pileup-free spectrum;
in the computer, subtracting the pileup spectrum from the measured spectrum to produce another estimate of the pileup-free spectrum;
in the computer, comparing the other estimate of the pileup-free spectrum to the estimate of the pileup-free spectrum that was used to estimate the pileup spectrum; and repeating the estimating the pileup spectrum, subtracting the pileup spectrum and comparing until the difference between successive estimates of the pileup-free spectrum falls below a selected threshold.

2. The method of claim 1 further comprising, in the computer, after assigning channels, linearizing the channels with respect to energy level.

3. The method of claim 1 further comprising, in the computer, adding selected numbers of detection events in MCA channels below a detection threshold energy level.

4. The method of claim 1 wherein the pileup fraction is computed as a polynomial function of duty-factor-corrected detector count rate, and wherein coefficients of the polynomial function are determined from a best match to pileup fractions determined from the variable count rate measurements.

5. The method of claim 1 wherein the estimating the pileup spectrum comprises convolving the pileup free spectrum with the pileup spectrum using a convolution algorithm.

6. The method of claim 5 wherein the convolving comprises computing the estimated pile up spectrum in MCA channel i, PUSpec(i) as the sum of the product of the pile up free spectrum in channel m, PUFreeSpec(m) multiplied by pile up free spectrum in MCA channel i-m, PUFreeSpec(m−1);

wherein $PUSpec(i) = \sum_{m=0}^{i} (PUfreeSpecLin(m) \cdot PUfreeSpecLin(i - m))$.

7. The method of claim 1 further comprising determining a normalized subtraction factor.

8. The method of claim 1 wherein estimating the pileup free spectrum comprises subtracting a product of the normalized subtraction factor and the pileup spectrum from the measured spectrum.

9. The method of claim 1 wherein the radiation detector comprises a scintillation counter coupled to at least one of a photomultiplier and other photon detector.

10. The method of claim 1 wherein the MCA comprises an integrating type analyzer.

11. The method of claim 1 wherein the MCA comprises a ramp analog to digital converter.

12. The method of claim 1 wherein the gamma rays result from interaction of neutrons emitted from a pulsed neutron source.

13. The method of claim 1 wherein the pileup free spectrum is initially set to the measured spectrum.

14. A method for well logging, comprising:
moving a well logging instrument along a wellbore, the instrument comprising a radiation detector having output signals related to an energy level of detected gamma rays;
assigning gamma rays detected by a the radiation to channels in a multichannel analyzer (MCA) wherein each channel represents a selected gamma ray energy level to generate a measured spectrum;
correcting detected gamma ray spectra for the effects of energy analyzer pileup, comprising:
in a computer, computing a pileup fraction of the measured spectrum;
in the computer, estimating a pileup spectrum from an estimate of a pileup-free spectrum;
in the computer, subtracting the pileup spectrum from the measured spectrum to produce another estimate of the pileup-free spectrum;
in the computer, comparing the other estimate of the pileup-free spectrum to the estimate of the pileup-free spectrum that was used to estimate the pileup spectrum; and repeating the estimating the pileup spectrum, subtracting the pileup spectrum and comparing until the difference between successive estimates of the pileup-free spectrum falls below a selected threshold.

15. The method of claim 14 further comprising, in the computer, after assigning channels, linearizing the channels with respect to energy level.

16. The method of claim 14 further comprising, in the computer, adding selected numbers of detection events in MCA channels below a detection threshold energy level.

17. The method of claim 14 wherein the pileup fraction is computed as a polynomial function of duty-factor-corrected detector count rate, and wherein coefficients of the polynomial function are determined from a best match to pileup fractions determined from the variable count rate measurements.

18. The method of claim 14 wherein the estimating the pileup spectrum comprises convolving the pileup free spectrum with the pileup spectrum determined in each channel determined as a sum of a pile up free spectrum value in each channel multiplied by a pile up free spectrum difference between adjacent channels.

19. The method of claim 18 wherein the convolving comprises computing the estimated pile up spectrum in MCA channel i, PUSpec(i) as the sum of the product of the pile up free spectrum in channel m, PUFreeSpec(m) multiplied by pile up free spectrum in MCA channel i-m, PUFreeSpec(m−1);

wherein $PUSpec(i) = \sum_{m=0}^{i} (PUfreeSpecLin(m) \cdot PUfreeSpecLin(i-m))$.

20. The method of claim 14 further comprising determining a normalized subtraction factor.

21. The method of claim 14 wherein estimating the pileup free spectrum comprises subtracting a product of the normalized subtraction factor and the pileup spectrum from the measured spectrum.

22. The method of claim 14 wherein the radiation detector comprises a scintillation counter coupled to at least one of a photomultiplier and another photon detector.

23. The method of claim 14 wherein the MCA comprises an integrating type analyzer.

24. The method of claim 14 wherein the MCA comprises a ramp analog to digital converter.

25. The method of claim 14 wherein the gamma rays result from interaction of neutrons emitted from a pulsed neutron source.

26. The method of claim 14 wherein the pileup free spectrum is initially set to the measured spectrum.

* * * * *